United States Patent
Chang et al.

[11] Patent Number: 6,048,143
[45] Date of Patent: Apr. 11, 2000

[54] COMPOSITE MECHANISM MULTI-AXIS MACHINE TOOL

[75] Inventors: Tsann-Huei Chang, Hsinchu; Yeou-Bin Guu, MiaoLi; Shang-Liang Chen, Tainan, all of Taiwan

[73] Assignee: Industrial Technology Research Institute, Hsinchu, Taiwan

[21] Appl. No.: 09/240,792

[22] Filed: Jan. 30, 1999

[51] Int. Cl.[7] .............................. B23C 1/06; B25J 11/00; B23Q 1/02
[52] U.S. Cl. ...................... 409/201; 74/490.05; 248/652; 408/234; 409/202; 409/211; 409/212; 409/235; 901/22; 901/23
[58] Field of Search ..................................... 409/201, 211, 409/216, 235, 202, 212; 408/234; 901/41, 28, 29, 22, 23; 414/729; 248/652; 74/490.03, 490.05

[56] References Cited

U.S. PATENT DOCUMENTS

| | | | |
|---|---|---|---|
| 3,752,596 | 8/1973 | Weyand et al. | 409/235 |
| 4,621,407 | 11/1986 | Suzuki | 409/235 |
| 4,632,615 | 12/1986 | Yamamura | 409/235 |
| 4,988,244 | 1/1991 | Sheldon et al. | 409/201 |
| 5,259,710 | 11/1993 | Charles | 409/201 |
| 5,333,514 | 8/1994 | Toyama | 74/490.03 |
| 5,388,935 | 2/1995 | Sheldon | 901/22 |
| 5,401,128 | 3/1995 | Lindem et al. | 409/201 |
| 5,538,373 | 7/1996 | Kirkham | 901/23 |
| 5,556,242 | 9/1996 | Sheldon et al. | 901/23 |
| 5,688,084 | 11/1997 | Fritz et al. | 409/235 |
| 5,715,729 | 2/1998 | Toyama et al. | 409/201 |
| 5,857,815 | 1/1999 | Bailey et al. | 409/201 |
| 5,906,461 | 5/1999 | Lunz et al. | 409/201 |

FOREIGN PATENT DOCUMENTS 8703528  6/1987  WIPO .................... 901/28

*Primary Examiner*—William Briggs
*Attorney, Agent, or Firm*—W. Wayne Liauh

[57] ABSTRACT

A composite mechanism multi-axis machine tool includes an orthogonal coordinate feeding axis mechanism and a parallel type spatial linkage mechanism. The orthogonal coordinate feeding axis mechanism has two orthogonal platforms to provide two dimensional motion vectors. The parallel type spatial linkage mechanism has three sets of linear feeding modules engaging with a base frame for holding a main spindle which further holds a tool cutter. The parallel type spatial linkage mechanism provides one dimensional motion and two dimensional rotation for the tool cutter. A controller is provided to control and coordinate the movements of the orthogonal coordinate feeding axis mechanism and the parallel type spatial linkage mechanism. It reduces accumulation of inertia and tolerance effect, and rigidity deficiency of conventional orthogonal coordinate multi-axis machine tool, and overcomes the problems of conventional hexapod parallel type spatial linkage mechanism such as difficult for position tuning, small working space, complex control system and high cost.

16 Claims, 5 Drawing Sheets

COMPOSITE MECHANISM MULTI-AXIS MACHINE TOOL

BACKGROUND OF THE INVENTION

1. Field of the Invention

This invention relates to a composite mechanism multi-axis machine tool and particularly to a multi-axis machine tool that combines a conventional orthogonal coordinate feeding axis mechanism and a parallel type spatial linkage mechanism for providing at least five dimensional axes movement.

2. Description of the Prior Art

Conventional orthogonal coordinate multi-axis machine tool (referring to FIG. 1 for a traditional three axes linear feeding machine tool as an example) has three feeding axes located respectively in three mutually orthogonal cantilever beams (such as X, Y, Z axes in FIG. 1). One axis is laid upon the other serially. The tolerance and feeding inertia of the main spindle is generally large and difficult to control because it is an aggregate of its own tolerance and inertia at Z-axis plus the tolerance and inertia of X and Y axes feeding members. The rigidity and precision of the main spindle 1 is thus suffered.

Another conventional orthogonal coordinate five-axis machine tool has three mutually orthogonal linear feeding axes and two rotating feeding axes. The linear feeding axes are serially laid upon one another. There are a variety of configurations for the two rotating axes. However they also are laid upon one another serially. It is bulky and high cost to fabricate. Inertia impact is difficult to alleviate. The rigidity and displacement acceleration problem at the main spindle 1 also are problems without effective solution.

In order to address aforesaid problems, there are improvements being made by some machine tools manufacturers. For instance, Geodetic Co., and Gidding & Lewis Co., have disclosed various types of Hexapod multi-axis machine tools. Ingersoll Co., has disclosed an octahedral machine tool frame under U.S. Pat. No. 5,259,710. They all try to use multiple parallel linkages mechanism to replace traditional orthogonal coordinate machine tool design to reduce inertia and tolerance accumulation effect, and to improve main spindle rigidity and machining acceleration between the cutter and the workpiece.

However some of the problems of aforesaid prior arts still remain, notably the followings:

1. the hexapod parallel type spatial linkage mechanism mostly uses ball joint. The fabrication techniques for high precision, high rigidity and large moving an angular ball joint still do not reach perfect level. Its service life and strength is also much lower than conventional bearing type rotation joint.
2. The fabrication, assembly and tuning of hexapod parallel type spatial linkage mechanism need very high degree of precision. The tuning work is done in a three-dimension space and is radically different from the traditional tuning work which is done on a plane. The tuning variables for hexapod linkage are many and difficult to control.
3. When there is a need for large movement angle of rotation axis for the machine tool, total orientational workspace for a hexapod parallel type linkage mechanism becomes very small. It is also difficult to make the orientational workspace a cubic square.
4. The orientational workspace might have singular points. To calculate the singular point and try to avoid it will significantly increase design difficulty.
5. The controller for a hexapod parallel type spatial linkage mechanism is a control system with multiple input and output variables in nonlinear nature. It is a complex system, takes long time to design and is expensive.

SUMMARY OF THE INVENTION

In view of aforesaid disadvantages, it is therefore an object of this invention to provide a composite mechanism multi-axis machine tool that will reduce the inertia and tolerance accumulation effect, and enhances rigidity. This invention also fixes the aforesaid problems of tuning difficulty, small orientational workspace, complex control system and high cost that happen to conventional five-axis machine tool and hexapod parallel type spatial linkage mechanism.

The composite mechanism multi-axis machine tool according to this invention employs an orthogonal axis feeding mechanism and a parallel type spatial linkage mechanism that combines the advantages of both mechanism to remedy the shortcomings of each other.

In a preferred embodiment of a machine tool of this invention, there is provided with an orthogonal coordinate feeding axis mechanism, a worktable, a parallel type spatial linkage mechanism, a machining module and a controller. The orthogonal coordinate feeding axis mechanism includes two platforms motion vectors. The worktable is located on the platforms and may make at least two dimensional movement because of the motion of the platforms. The parallel type spatial linkage mechanism is made by degrading a conventional hexapod parallel spatial linkage mechanism to form a three axes motion parallel linear feeding modules which parallelly connect a base frame. Each linear feeding module includes a linear rail, a sliding block which may move linearly along the linear rail and a link having one end pivotly engaged with the sliding block. Another end of the link is pivotly engages with the base frame. Through the linear motion of the sliding blocks on the rails, the base frame may perform at least one dimensional linear motion and two dimensional rotational motion. The machining module includes a main spindle for holding a cutter such as a drill, lathe tool, milling cutter, or etc.. The main spindle is mounted on the base frame and facing the worktable to facilitate machining work on a workpiece mounted on the worktable. The controller controls and coordinates the orthogonal coordinate feeding axis mechanism and the parallel type spatial linkage mechanism to control the machining module to perform required machining work on the workpiece. Because of the composite structure set forth above, this invention may provide at least five dimensional motion axes. As the orthogonal coordinate feeding axis mechanism has only two platforms laying upon one another, the inertia and tolerance accumulation effect is less severe than a conventional one. The three axes motion parallel type spatial linkage mechanism has greater rigidity than a hexapod mechanism. It is also easier to position the base frame and tuning. The control system is simpler and costs less.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
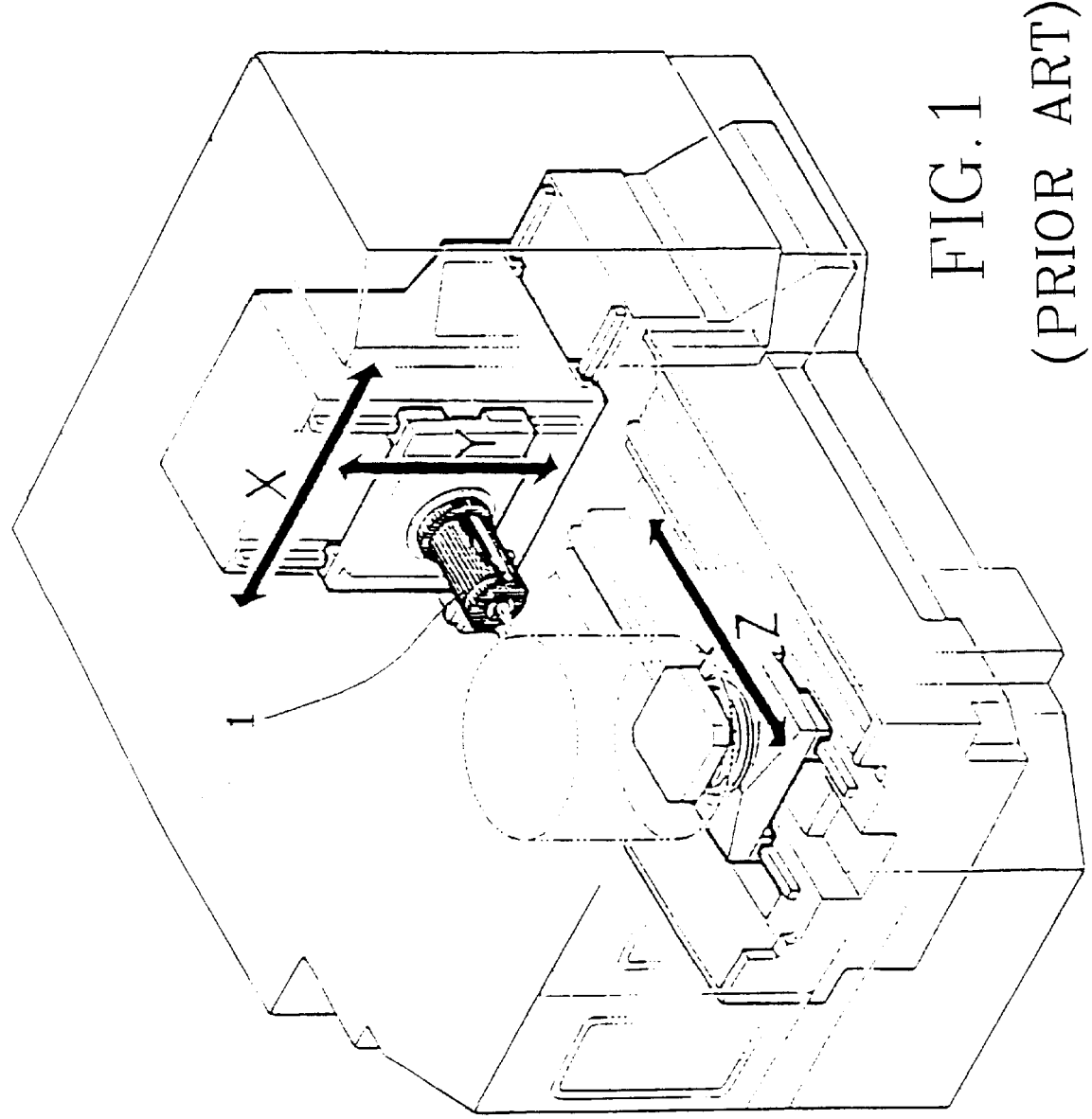
FIG. 1 is a pictorial view of a conventional three-axis feeding machine tool.
Figure 2:
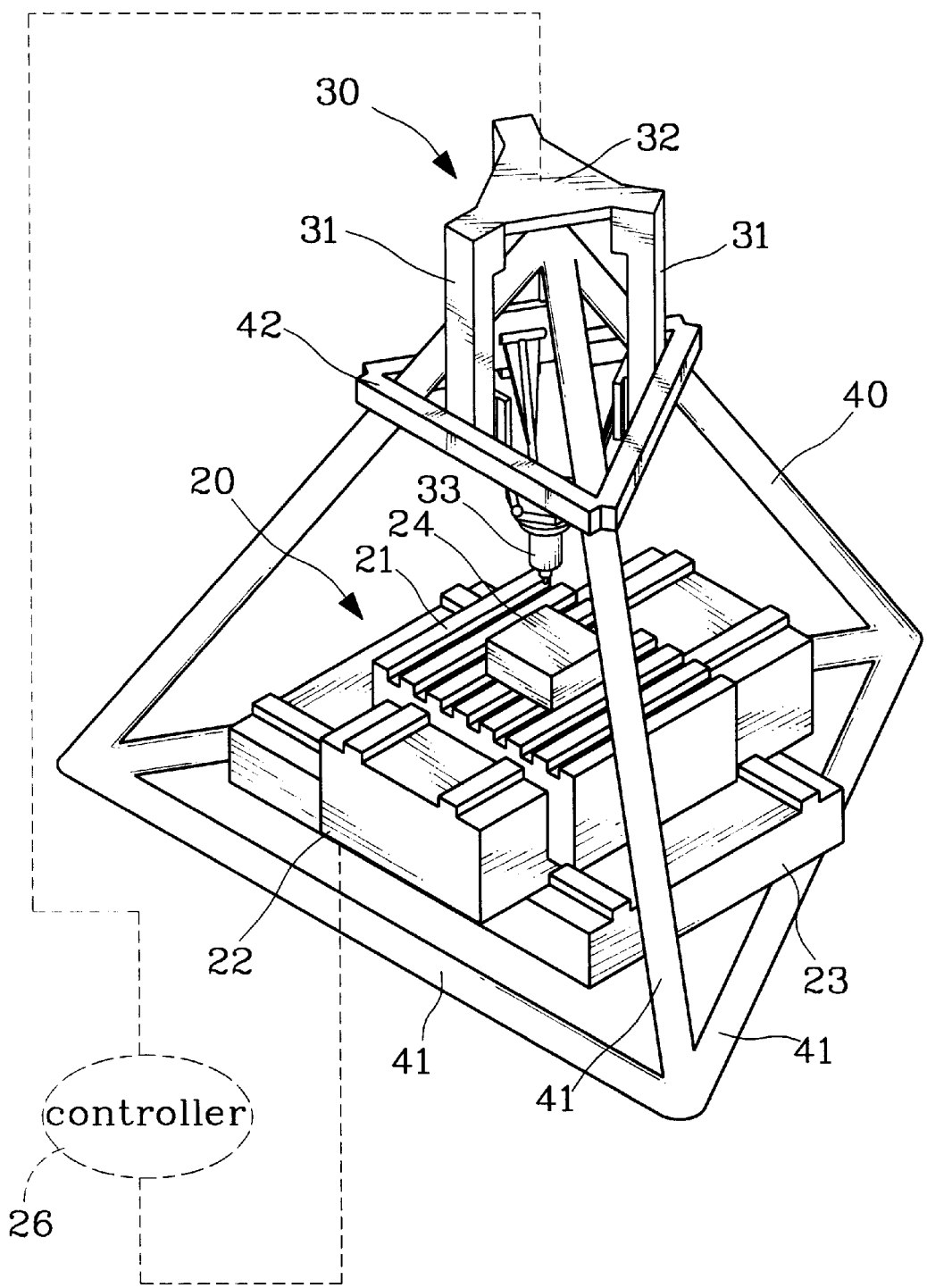
FIG. 2 is a perspective view of a preferred embodiment of this invention.
Figure 4:
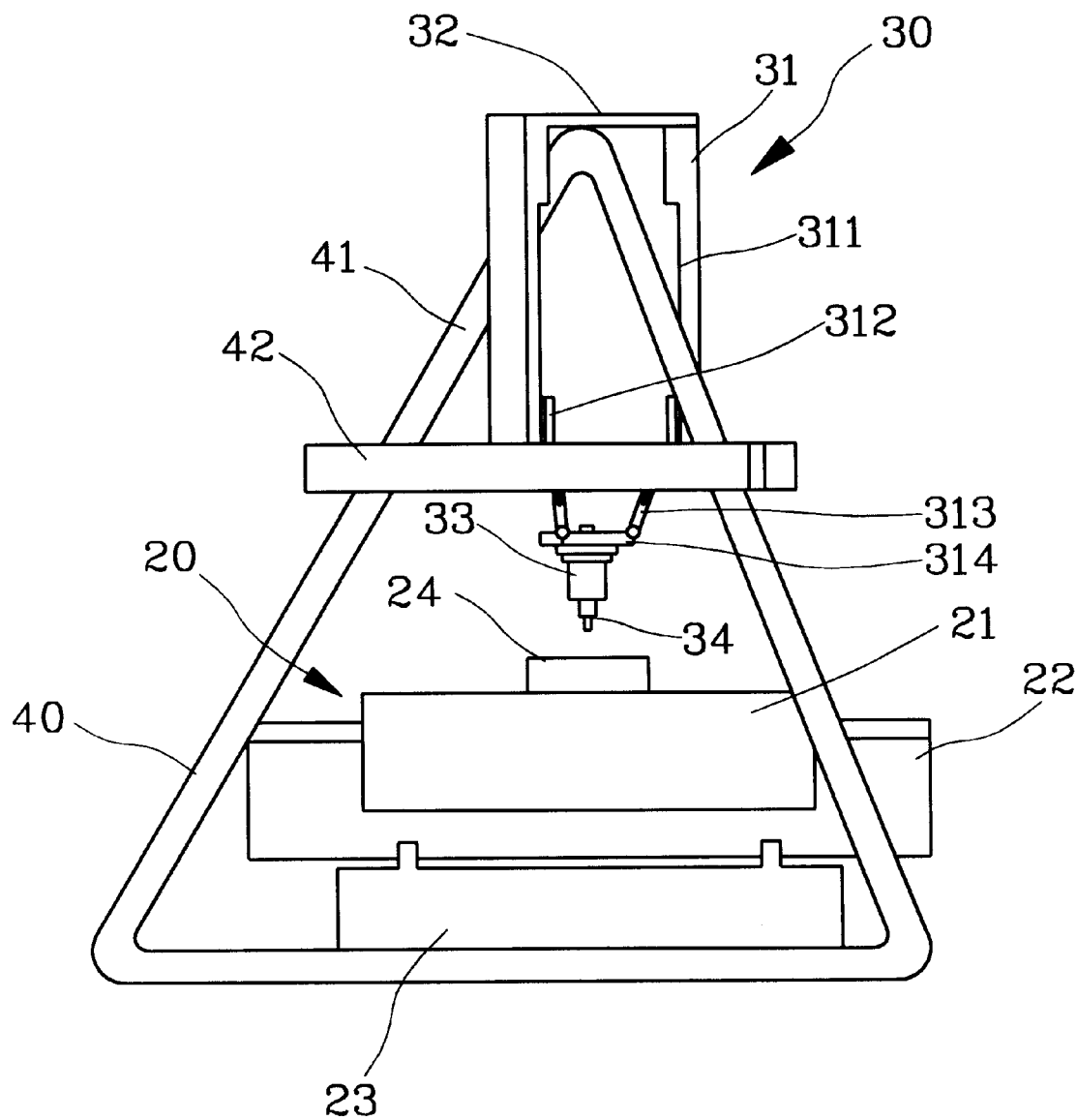
FIG. 4 is a side elevation view of this invention shown in FIG. 2.

Referring to FIG. 2 and 4, the composite mechanism multi-axis machine tool according to this invention includes mainly an orthogonal coordinate feeding axis mechanism 20 and a parallel type spatial linkage mechanism 30.

The orthogonal coordinate feeding axis mechanism 20 includes a worktable 21 and a plurality (preferably two or three) of platforms orthogonally overlapping one upon another. In a preferred embodiment shown in FIG. 2, there is a first platform 22 laying above a second platform 23. The worktable 21 is further laying above the first platform 22. On the top surface of the platforms 22 and 23, there are provided respectively with linear channels (not labeled) that are normal with each other, so that the first platform 22 may be moved linearly along the channels in the second platform 23 while the worktable 21 may be moved linearly along the channels in the first platform 22 and in normal direction to the channels of the second platform 23. This orthogonal coordinate feeding axis mechanism 20 thus may provide two dimensional motion vectors for the worktable 21. Comparing with a conventional orthogonal coordinate five axes machine tool, this invention costs less, inertia and tolerance accumulation effect is less severe, easy for position tuning, control system is simple to design and has cubic square and large working space.

Figure 3:
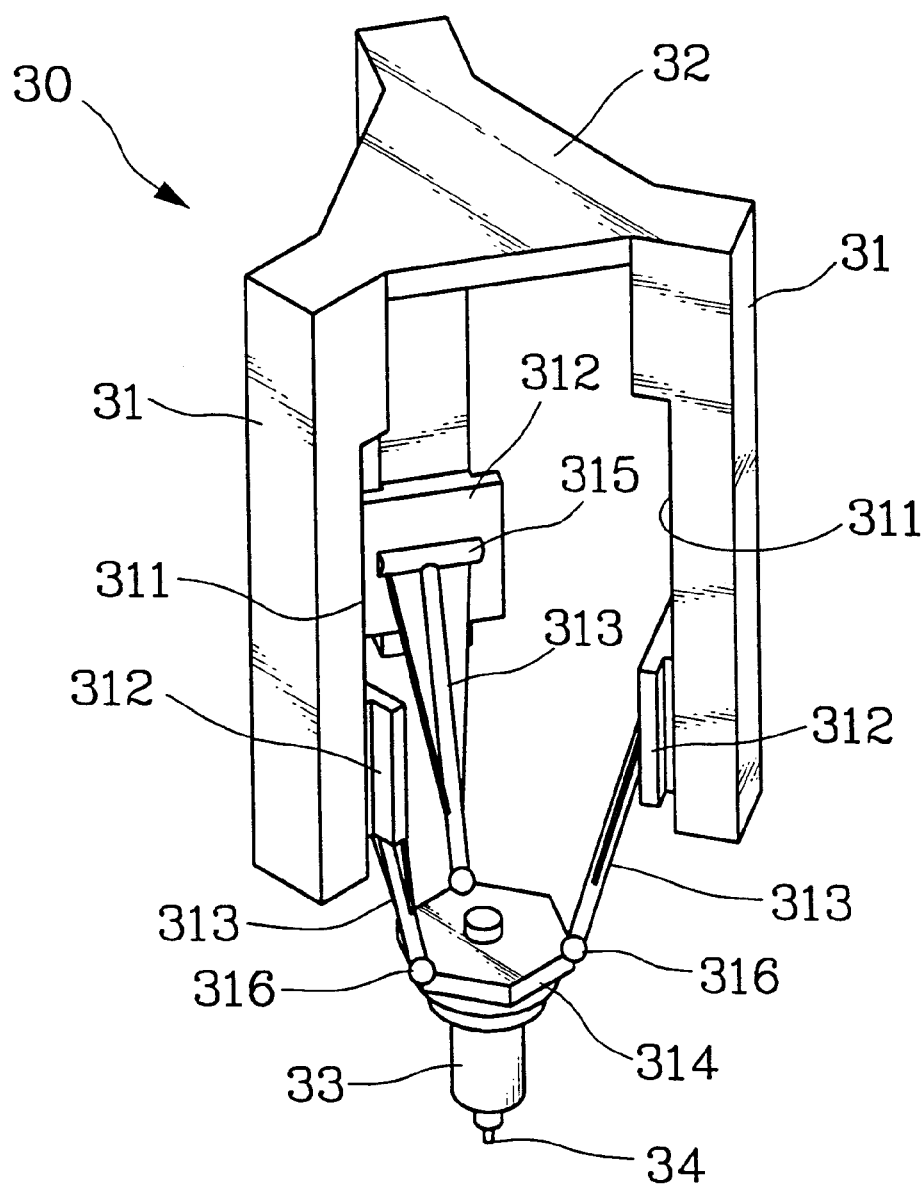
FIG. 3 is a perspective view of a parallel type spatial linkage mechanism of this invention.

Referring to FIGS. 2 and 3, the parallel type spatial linkage mechanism 30 according to this invention includes three linear feeding modules 31 parallelly connecting with a base frame 314. Each feeding module 31 is pivotly engaged with the base frame 314. Through the motion of three feeding modules 31, the base frame 314 may have at least two dimensional rotation motion. It is a degraded design of traditional hexapod parallel type spatial linkage mechanism. The following offers more detailed structure of a preferred embodiment of this invention shown in FIGS. 2 and 3.

Each linear feeding module 31 includes a linear rail 311, a sliding block 312 movable linearly along the linear rail 311 and a link 313. The rails 311 are equally spaced from one another and form substantially equilateral triangle three legs pillar structure. The pillar has a base 32 fixedly connects with the rails 311 at one end to form a stool like member. Each link 313 has one end forming a first joint 315 pivotly engaged with the sliding block 312 for rotating at least in one dimensional axis. Another end of the link 313 forms a second joint 316 pivotly engaging with the base frame 314. The three second joints 316 are equally spaced from one another. Through the linear motion of the sliding block 312 on the rail 311, this parallel type spatial linkage mechanism may offer at least one dimensional linear motion and two dimensional rotation motion.

The first joint 315 connecting the link 313 and the sliding block 312 is constructed by engaging an axle located at one end of the link 313 and a bearing located in the sliding block 312 (not shown in the figures). Of course the axle may also be located in the sliding block 312 while the bearing located on the link 313. The axle and bearing form the pivotal first joint 315 that is strong, less expensive, easier to produce and lasts longer than ball joint used in the prior arts. It can provide at least one dimensional rotation motion.

The second joint 316 connecting the link 313 and the base frame 314 is a universal joint known in the art (not shown in the figures) which has two sets of axle and bearing connecting with each other for providing at least two dimensional rotation motion. Comparing with a ball joint for three axes rotation used in the prior arts, this universal joint has proven production techniques, lower cost, greater strength and longer service life. It also has large motion angle, higher rigidity and more precision.

Referring to FIGS. 2, 3 and 4, when this invention is in use, a work piece 24 is clamped on the worktable 21. The base frame 314 has a machining module mounted thereon and facing the workpiece 24 for performing machining work desired on the workpiece. The machining module may include a main spindle 31 attaching a machining tool 34 at one end thereof. The machining tool 34 may be a drill, a lathe tool or milling cutter. The machining module may also be an electric welding means, an argon welding means or an ultrasonic welding means.

Referring to FIGS. 2 and 4, the parallel type spatial linkage mechanism 30 is supported by a frame means 40 which is constructed by a plurality of struts 41 to form a substantially pyramid frame. The pinnacle of the pyramid frame supports and fixes to the bottom surface of the base 32 at the center thereof. A triangular shaped reinforced frame 42 is horizontally fixed to the upper portion of the frame means 40 with the linear rails 311 securely fixed to the reinforced frame 42. The parallel type spatial linkage mechanism 30 thus may be firmly supported by the frame means 40. The orthogonal coordinate feeding axis mechanism 20 is also securely mounted at the lower portion of the frame means 40. Hence the machining module (main spindle 33) may perform effective machining work on the workpiece 24. The pyramid frame means 40 also defines an effective machining space. It maintains a machining space like a conventional five axes machine tool that is larger than the machining space of a hexapod parallel type spatial linkage mechanism.

The motion of the parallel type spatial linkage mechanism 30 and the orthogonal coordinate feeding axis mechanism 20 is controlled and coordinated by a controller 26. Cutting path of the workpiece 24 and cutting angle of the machining module (i.e., the main spindle 33) are fed to the controller 26 for calculation. The controller 26 then controls the movement of the parallel type spatial linkage mechanism 30 and the orthogonal coordinate feeding axis mechanism 20 to enable the machining module to perform the machining work needed. It can obtain the cutting path like a five axes machine tool but with much simpler calculation and control than a hexapod parallel linkage mechanism. The controller 26 is thus easier to make for this invention. The controller 26 makes necessary calculation and processing, then actuates the linear feeding modules 31 to move as needed. While the sliding block 312 moves linearly, the link 313 turns about the first joint 315 and about the second joint 316. Consequently the base frame 314 will be moved and turned. Therefore the main spindle 33 may be moved by one axis linearly and two axes angularly. Furthermore the orthogonal coordinate feeding axis mechanism 20 may also receive instructions from the controller 26 for moving the workpiece 24 horizontally to complement the motion of the main spindle 33.

Figure 5:
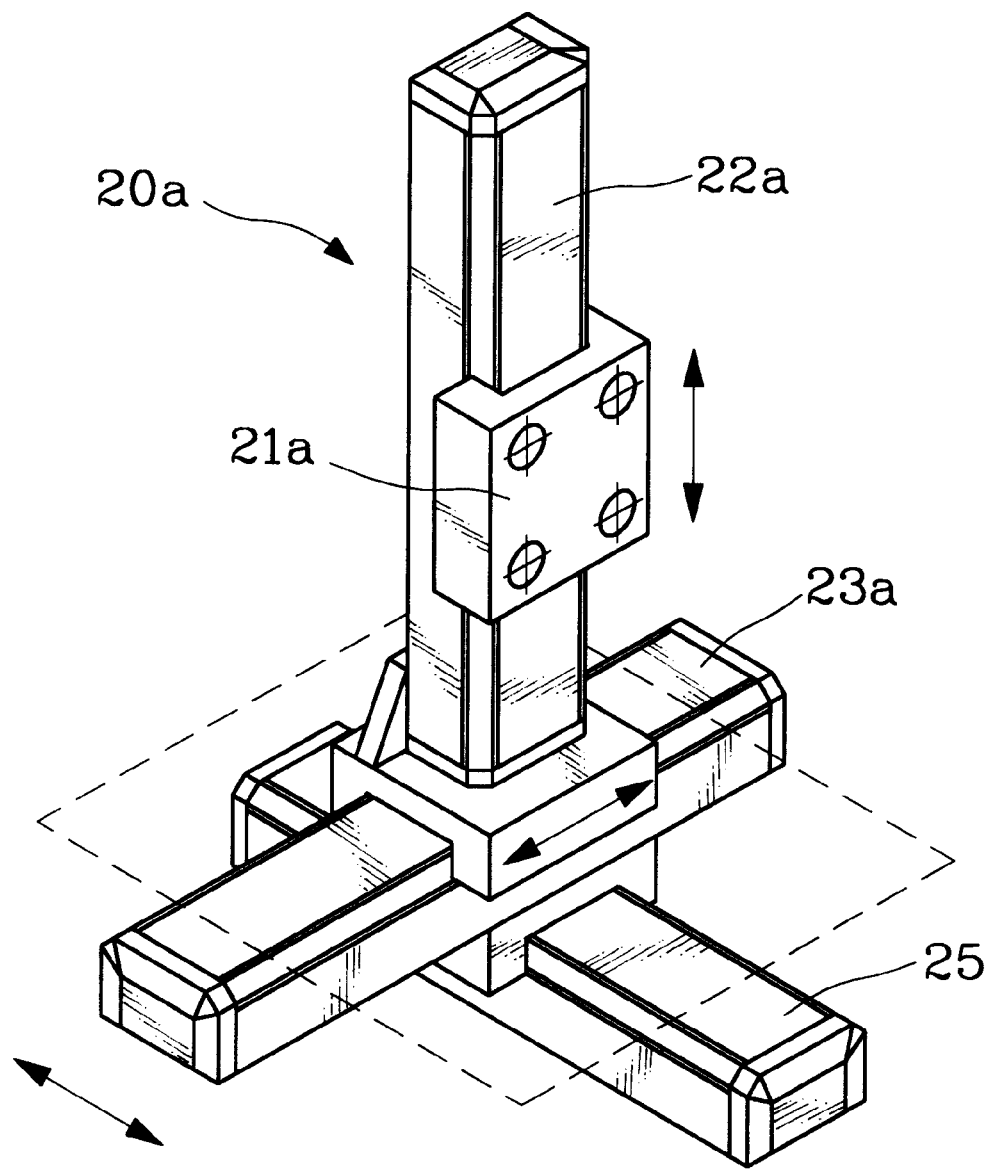
FIG. 5 is a perspective view of another embodiment of an orthogonal coordinate feeding axis mechanism of this invention.

FIG. 5 illustrates another embodiment of the orthogonal coordinate feeding axis mechanism 20a of this invention. Same numerals are given to same or similar elements shown in the embodiment set forth above. It includes a first platform 22*a*, a second platform 23*a* and a third platform 25, each platform being laid upon one another and being mutually normal to each other. Hence a worktable 21*a* mounted on the first platform 22*a* may have three dimensional linear motion. This embodiment provides even more flexibility in machining space position and angle manipulation.

It may thus be seen that the objects of the present invention set forth herein, as well as those made apparent from the foregoing description, are efficiently obtained. While the preferred embodiments of the invention have been set forth for purpose of disclosure, modifications of the disclosed embodiments of the invention as well as other embodiments thereof may occur to those skilled in the art.

For instance the followings are some of the variations may be made based on the disclosed embodiments:

1. the second joint 316 connecting the link 313 and the base frame 314 may be substituted by a ball joint.
2. The parallel type spatial linkage mechanism 30 may use four or even more sets of linear feeding module 31 instead of three.
3. The frame means 40 may be in other forms rather than a pyramid shape. The pinnacle to support the base 32 may be replaced by other alternatives. Broadly speaking, another structure that can engage and support both the orthogonal coordinate feeding axis mechanism 20 and the parallel type spatial linkage mechanism 30 may be used.
4. The parallel type spatial linkage mechanism 30 derived from degration design of more than two axes rotation mechanism may be replaced by other parallel type linkage mechanism that supports more than two axes rotation.

Accordingly, the appended claims are intended to cover all embodiments which do not depart from the spirit and scope of the invention.

What is claimed is:

1. A composite mechanism multi-axis machine tool, comprising:

an orthogonal coordinate feeding axis mechanism having at least two movable orthogonal platforms for providing at least two dimensional vector feeding;

a worktable mounted on the platforms and being movable with the platforms for providing at least two dimensional motion;

a parallel type spatial linkage mechanism having a plurality of linear feeding modules, each linear feeding module includes a linear rail, wherein each linear rail is parallel to each other linear rail, a sliding block movable linearly along the linear rail and a link having one end pivotally engaged with the sliding block for giving at least one dimensional rotation and another end pivotally engaged with the base frame at a different location so that by the linear motion of the sliding blocks the base frame may perform at least two axes rotation motion;

a machining module mounted on the base frame and facing the worktable; and a controller for controlling and coordinating the motion of the orthogonal coordinate feeding axis mechanism and the parallel type spatial linkage mechanism so that the machining module has a desired position and angle toward the worktable for performing machining work desired.

2. The composite mechanism multi-axis machine tool of claim 1, wherein the base frame has at least one linear dimension motion and two rotational dimensions motion resulting from the linear motion of the sliding blocks on the rails.

3. The composite mechanism multi-axis machine tool of claim 1, wherein the rails of the linear feeding modules are spaced from one another and being fixed to a base remote from the base frame.

4. The composite mechanism multi-axis machine tool of claim 1, wherein said one end of the link engaged with the sliding block has an axle engageable with a bearing located in the sliding block for giving the link at least one dimensional rotational motion about the bearing.

5. The composite mechanism multi-axis machine tool of claim 1, wherein the another end of the link engaged with the base frame is through an universal joint which has two sets of axle and bearing connecting with each other for providing the base frame at least two dimensional rotation about another end of the link.

6. The composite mechanism multi-axis machine tool of claim 1, wherein the another end of the link engages with the base frame through a ball joint.

7. The composite mechanism multi-axis machine tool of claim 1, wherein three sets of linear feeding modules have been provided, the rail of each linear feeding module is parallel and spaced from one another to form a substantially equilateral triangular member all together, the location of the base frame engaging with another end of the link being equally spaced from each other such that the rail, link and base frame form a parallel type linkage mechanism.

8. The composite mechanism multi-axis machine tool of claim 1, wherein the machining module includes a main spindle having a cutting tool attached at one end thereof for machining on a workpiece mounted on the worktable.

9. The composite mechanism multi-axis machine tool of claim 1, wherein the orthogonal coordinate feeding axis mechanism includes a first platform laid upon a second platform, the first platform has first linear channels formed normal to second linear channels on the second platform, the worktable being located on the first platform and being movable along the first linear channels, the first platform being movable along the second linear channels of the second platform.

10. The composite mechanism multi-axis machine tool of claim 3, wherein the parallel spatial linkage mechanism is supported by a substantially pyramid-shaped frame constructed by means of a plurality of struts, the pyramid-shaped frame having a pinnacle to support the base at the center thereof.

11. A composite mechanism multi-axis machine tool, comprising:

a two dimensional work platform means including a worktable movable along a first linear channel located on a top surface of a first platform, the first platform being laid upon a second platform and being movable along a second linear channel located on a top surface of the second platform, the first channel being normal to the second channel such that the worktable is movable in at least two dimensional directions;

a three dimensional kinetic means including three sets of parallel and equally spaced linear rails and a main spindle base frame, each linear rail having a sliding block movable along the linear rail, the sliding block being pivotally engaged with one end of a link, another end of the link being pivotally engaged with the base frame at a predetermined location such that the base frame has at least one dimensional linear motion and two dimensional rotation motion because of the movement of the sliding blocks; and a controller for controlling and coordinating movement of the two dimensional work platform means and the three dimensional kinetic means to form at least five dimensional motion multiple axes machine tool.

12. The composite mechanism multi-axis machine tool of claim 11, wherein the one end of the link engaged with the sliding block has an axle engageable with a bearing located in the sliding block for giving the link at least one dimensional rotational motion about the bearing.

13. The composite mechanism multi-axis machine tool of claim 11, wherein said another end of the link engages with the base frame through a ball joint.

14. The composite mechanism multi-axis machine tool of claim 11, wherein the three linear rails are mutually parallel and spaced from one another and being fixed to a base remote from the base frame.

15. The composite mechanism multi-axis machine tool of claim 11, wherein the three dimensional kinetic means is supported by and fixed to an upper portion of a frame means located above the two dimensional work platform means such that the base frame is facing the worktable.

16. The composite mechanism multi-axis machine tool of claim 15, wherein the frame means is supported by a substantially pyramid-shaped frame constructed by means of a plurality of struts, the pyramid-shaped frame having a pinnacle to support the base at the center thereof.

* * * * *